(12) United States Patent
Wang et al.

(10) Patent No.: US 12,335,647 B2
(45) Date of Patent: Jun. 17, 2025

(54) TIME-RESOLVING COMPUTATIONAL IMAGE SENSOR ARCHITECTURE FOR TIME-OF-FLIGHT, HIGH-DYNAMIC-RANGE, AND HIGH-SPEED IMAGING

(71) Applicant: Samsung Electronics Co., Ltd., Suwon-si (KR)

(72) Inventors: Yibing Michelle Wang, Temple City, CA (US); Lilong Shi, Pasadena, CA (US); Kwang Oh Kim, Cerritos, CA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 0 days.

(21) Appl. No.: 18/529,767

(22) Filed: Dec. 5, 2023

(65) Prior Publication Data

US 2024/0114257 A1 Apr. 4, 2024

Related U.S. Application Data

(63) Continuation of application No. 17/131,342, filed on Dec. 22, 2020, now Pat. No. 11,877,079.

(51) Int. Cl.
*H04N 25/71* (2023.01)
*H04N 25/75* (2023.01)
*H04N 25/771* (2023.01)

(52) U.S. Cl.
CPC ........... *H04N 25/745* (2023.01); *H04N 25/75* (2023.01); *H04N 25/771* (2023.01)

(58) Field of Classification Search
CPC .... H04N 25/745; H04N 25/75; H04N 25/771; H04N 25/768; H04N 25/772; H04N 25/00; H04N 23/741; H04N 25/40; H04N 25/77; H04N 25/57; H04N 25/705

See application file for complete search history.

(56) References Cited

U.S. PATENT DOCUMENTS

| 9,025,883 B2 | 5/2015 | Bernal et al. |
| 10,104,318 B2 | 10/2018 | Smith et al. |
| 10,116,925 B1 | 10/2018 | Wang et al. |
| 11,877,079 B2 * | 1/2024 | Wang ..................... H04N 25/40 |
| 2009/0268065 A1 * | 10/2009 | Fereyre .................. H04N 25/77 |
| | | 348/294 |

(Continued)

FOREIGN PATENT DOCUMENTS

| GB | 2486039 A * | 6/2012 | ............... H04N 5/32 |
| WO | 2017/003477 A1 | 1/2017 | |
| WO | 2018/158482 A1 | 9/2018 | |

*Primary Examiner* — Nhan T Tran
(74) *Attorney, Agent, or Firm* — Lewis Roca Rothgerber Christie LLP

(57) ABSTRACT

A pixel for an image sensor includes a photon sensor, a memory, and an accumulator. The photon sensor element portion outputs a signal to an accumulator, which then may add value stored in memory together and may transfer the result to the memory of another pixel. The pixel may be analog or digital and may be used in a pixel array for compressed sensing imaging. During imaging, a pseudo-random mask may also be used. The data collected during imaging may be used in compressed sensing and may be sent to an offline storage to be processed.

20 Claims, 14 Drawing Sheets

(56) References Cited

U.S. PATENT DOCUMENTS

| | | | | |
|---|---|---|---|---|
| 2013/0278804 | A1* | 10/2013 | Denham | H04N 25/46 |
| | | | | 29/831 |
| 2018/0191973 | A1* | 7/2018 | Hirota | H04N 25/76 |
| 2018/0224552 | A1* | 8/2018 | Wang | H04N 19/593 |
| 2019/0335129 | A1* | 10/2019 | Tyrrell | H04N 25/00 |
| 2022/0239822 | A1* | 7/2022 | Genov | G01S 17/894 |

\* cited by examiner

FIG. 5

TIME-RESOLVING COMPUTATIONAL IMAGE SENSOR ARCHITECTURE FOR TIME-OF-FLIGHT, HIGH-DYNAMIC-RANGE, AND HIGH-SPEED IMAGING

CROSS-REFERENCE TO RELATED APPLICATIONS

This application is a continuation of U.S. patent application Ser. No. 17/131,342, filed on Dec. 22, 2020, entitled, TIME-RESOLVING COMPUTATIONAL IMAGE SENSOR ARCHITECTURE FOR TIME-OF-FLIGHT, HIGH-DYNAMIC-RANGE, AND HIGH-SPEED IMAGING, the entire content of which is incorporated herein by reference.

TECHNICAL FIELD

The subject matter disclosed herein relates to compressed sensing on image sensors. More specifically, the subject matter disclosed herein relates to a method to provide data for compressed sensing and a corresponding pixel architecture.

BACKGROUND

The following background is intended solely to provide information necessary to understand the context of the inventive ideas and concepts disclosed herein. Thus, this background section may contain patentable subject matter and should not be regarded as a disclosure of prior art.

In signal processing, there are many techniques for acquiring and reconstructing a signal. One such technique is known as compressed or compressive sensing. The concept of compressed sensing is based on the principle that a sparse signal can be reconstructed from fewer samples than required by the Nyquist-Shannon sampling theorem. Compressed sensing attempts to reconstruct a signal by finding solutions to an underdetermined system. An underdetermined system is one where there are more variables than equations. Capturing images digitally and attempting to reconstruct the images may be one example of an underdetermined system. One design for a compressed sensing optical system, by Duarte et al. (Marco Duarte, Mark Davenport, Dharmpal Takhar, Jason Laska, Ting Sun, Kevin Kelly, and Richard Baraniuk, Single-pixel imaging via compressive sampling. (IEEE Signal Processing Magazine, 25(2), pp. 83, March 2008)), includes a digital micro-mirror device that reflect parts of an incoming light beam toward a single photodiode sensor. For every clock cycle, one part of the image may be imaged by the photodiode, and the data is sent offline to be processed with a compressed sensing algorithm. This approach requires additional processing and does not allow for multiple pixels. Furthermore, this technique may be limited to stationary objects and has a low resolution. Thus, there exists a need for a compressed sensing hardware design to allow for better sensing options with higher resolution. With better resolution, additional applications including high-speed imaging, time-of-flight sensing, and high dynamic-range imaging could be available.

SUMMARY

An example embodiment provides a pixel for an image sensor that may include a photon sensor, a memory, and an accumulator. The photon sensor may be used to collect photon information. The accumulator may act as a temporary storage to hold intermediate data values of photon information and add together data values of photon information. The photon sensor may be connected to the accumulator, and the memory may be connected to the accumulator. In some embodiments, the memory and accumulator may be a single device serving both functions of storing and accumulating data or charge. During a photon detection event, the photon sensor may convert photons into an electrical signal and may send data to the accumulator. Additionally, the memory may send data to the accumulator, which may add data values together. The pixel may be in an analog or digital configuration.

An example embodiment provides a pixel row or column that may be used in a pixel array in a readout method for compressed sensing. The pixel row may comprise digital or analog pixels connected together in series. The accumulator of a first pixel may be connected to the memory of a second pixel, and so on for the pixel row. A data bus may be connected to the memories of the pixels and may provide a clock signal. An accumulator of one of the pixels may be connected to an offline storage that may be used to collect and process compressed sensing data collected from the pixel row.

An example embodiment provides a pixel array of pixels that may be used for compressed sensing. There may be a mask applied on the pixel array during sensing.

An example embodiment provides for a series of pixels where data may be transferred between pixels. In a first clock cycle, a first pixel may collect a first photon count from a photon information element, and storing the first photon information in an accumulator, add a second photon count from a memory associated with the first pixel into the accumulator to obtain a third photon information, send the third photon information to a memory associated with a second pixel, and reset the value in the sensor element and accumulator to zero.

The pixel architectures may be used in high-speed imaging to integrate a desired number of time slices at certain speed settings; high-dynamic-range imaging to use a desired ceiling value of photon count to limit the output of each pixel for each time slice and then to integrate the time slices together; time-of-flight sensing to take multiple compressed images and recover time slices of each run, finding peak values of each pixel to determine time-of-flight and therefore distance; coincidence detection, and many other applications.

BRIEF DESCRIPTION OF THE DRAWINGS

In the following section, aspects of the subject matter disclosed herein will be described with reference to example embodiments illustrated in the figures.

FIG. 5 is a data flow and timing diagram that may be used in an example embodiment of compressed sensing for a single column or row of pixels in a pixel array.

DETAILED DESCRIPTION

Figure 1A:
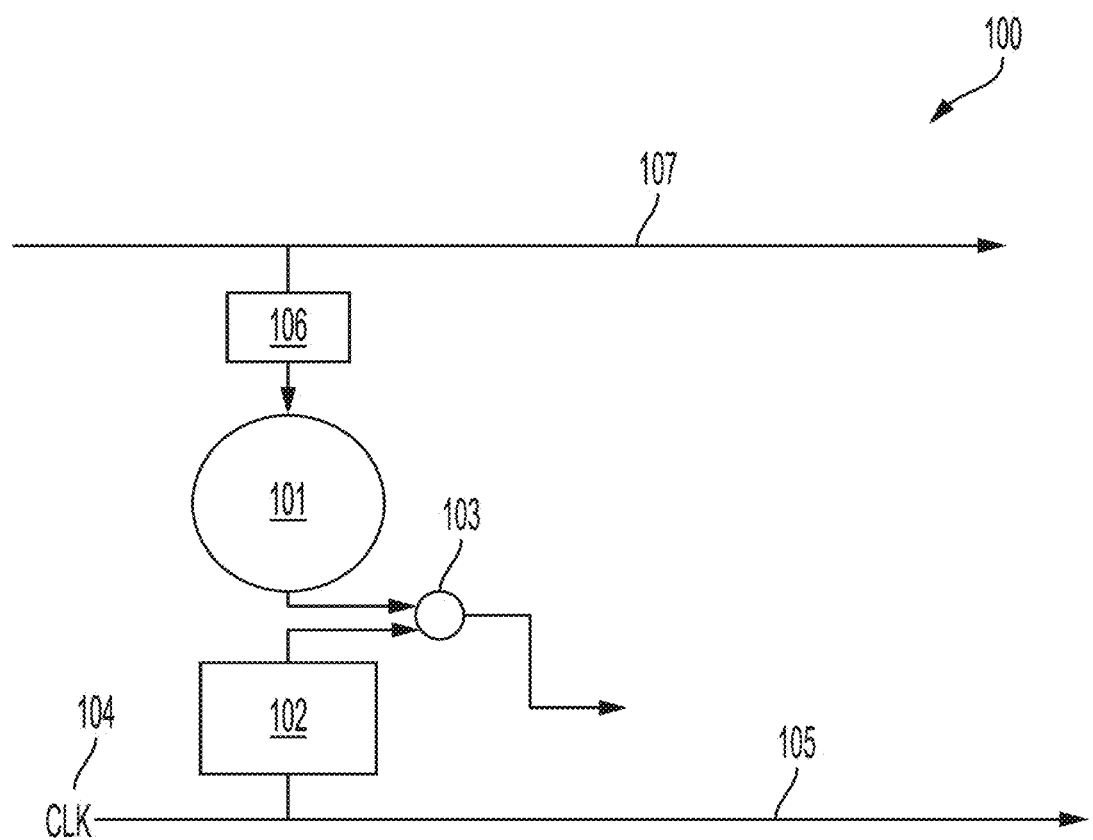
FIG. 1A is an example pixel that may be used in an example embodiment of a pixel array that may be used in some example embodiments of a readout method for compressed sensing.

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail not to obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not be necessarily all referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. Similarly, various waveforms and timing diagrams are shown for illustrative purpose only. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

With compressed sensing, sparsity in a signal in some domains is either assumed to be true or may be introduced to allow for solving of the image reconstruction problem. Sparsity reduces the number of variables to solve for in an underdetermined system. For example, several pixels on a pixel array may be forced to a zero value to create a sparser signal that may then be used for image reconstruction. One such approach to force some pixels to zero is to generate a mask. A mask may be a pseudo-randomly generated array of locations that can be applied to a pixel array used for capturing images. It may apply binary values (0 and 1) or other weighted values, to the pixels impacted by the mask.

An example compressed sensing measurement may be described with y=Ax+e, where x is the signal, such as an image, y are the samples, such as what was captured by a pixel array, A is a measurement matrix or sampling operator in an M by N matrix, and e is measurement noise. The variable x may be a vector N by 1, y may be a vector M by 1, and M may be less than N, typically much smaller than N. In another embodiment, the variable x may be a vector N+b by 1, where b represents a shift number associated with image capture from an image capturing device, which will be described in the discussion of FIG. 4A-B. Each measurement may be the inner product, or correlation, between the signal x and a sensing function. For vector x, N may be the value of signal x sampled S times, which may be considered S-sparse. With compressive sensing, vector x is assumed to be S-sparse or has a pseudo-random mask applied to it to allow for sparsity. A compressed sensing algorithm can solve for the matrix A.

If signal x is sparse, it may have a representation in a basis Z or a redundant dictionary D, where y=Zx or y=Dx. Additionally, if A satisfies a restrictive isometry property, then the coefficients for A can be reconstructed by an L1 optimization problem: y=AZx+e, where $\hat{x}=\min\|x\|_1$ such that $\|y-AZ\hat{x}\|_2 \leq \epsilon$. If a signal is x is not sparse, then a pseudo-random mask may be applied to the signal such that the optimization problem can be satisfied. Algorithms to solve for the optimization problem may include, but are not limited to, basic purist, gradient projection for sparse reconstruction, L1 regularized least squares, fixed-point continuation, fast iterative shrinkage-thresholding algorithms, deep learning, and Bayesian methods.

Compressed sensing applications include, but are not limited to, optical systems such as time-of-flight sensing, high-dynamic-range image capturing, high-speed imaging, holography, facial recognition; magnetic resonance imaging; and analog-to-digital conversion. Within optical systems, hardware designs of pixel arrays and data acquisition architecture are needed to enable compressed sensing.

FIG. 1A is an example pixel 100 that may be used in an example embodiment of a pixel array that may be used in some example embodiments of a readout method for compressed sensing. Pixel 100 includes a photon sensor 101, a memory 102, and an accumulator 103. Photon sensor 101 may be used to collect photon information values and may be a digital or analog element, such as a photodiode, pinned photodiode, single photon avalanche diode (SPAD), avalanche photodiode (APD), quanta image sensor (QIS), contact image sensor (CIS), charge-coupled device (CCD), bolometer, or other sensor type. Photon information values produced by photon sensor 101 may be digital, such as a count of photons, or may be analog, such as a charge, depending on the particular photon sensor 101 used. Memory element 102, which may be referred to as memory 102, may be a digital or analog memory such as RAM, SRAM, DRAM, or a register, capacitor, or other memory source. Photon sensor 101 may be connected to accumulator 103. In some example embodiments, accumulator 103 may be a register that may act as a temporary storage to hold intermediate values. Accumulator 103 may also add together values. For example, a value already in the accumulator may be added to a value (e.g. photon information) received from photon sensor 101. Memory 102 may be connected to accumulator 103. During a photon detection event, photon sensor 101 may convert photons into an electrical signal and may send data to accumulator 103. Additionally, memory 102 may send data to accumulator 103, which may add data together. A clock signal 104 may be used to send a clock signal on a data bus 105. Data bus 105 may be connected to memory 102 and photon sensor 101 (not shown) and may send clock signal 104. Data bus 105 may be used for sending clock signal 104 to pixel 100, reading out data from pixel 100, or both. In some embodiments, a separate bus may be used to send data and clock signals (not shown). In some embodiments, after one clock cycle, photon sensor 101 may be reset to a zero value. Furthermore, accumulator 103 may also be reset after data is transmitted to a memory 102 of a different pixel 100, as will be described with regard to FIG. 2A.

In some embodiments, memory 102 and accumulator 103 may be combined into a single logical unit that performs the same tasks of memory storage and accumulation, respectively. For example, a capacitor may be an accumulator and a memory storage device and may be used in an analog pixel design. An existing charge in a capacitor is accumulated and stored with additional charge added from the output of a photon sensor 101.

In another embodiment, a mask memory 106 may connect to photon sensor 101 and may provide logic to stop photon sensor 101 from sensing. In another embodiment, mask memory 106 may be connected to accumulator 103 and may provide logic to stop accumulator 103 from adding values from photon sensor 101. A data bus 107 may be connected to mask memory 106 to provide data transfer capabilities. Mask memory 106 and data bus 107 may be elements used in alternative embodiments for compressed sensing applications that utilize masks, which will be described with respect to FIG. 1B and FIG. 7.

Figure 1B:
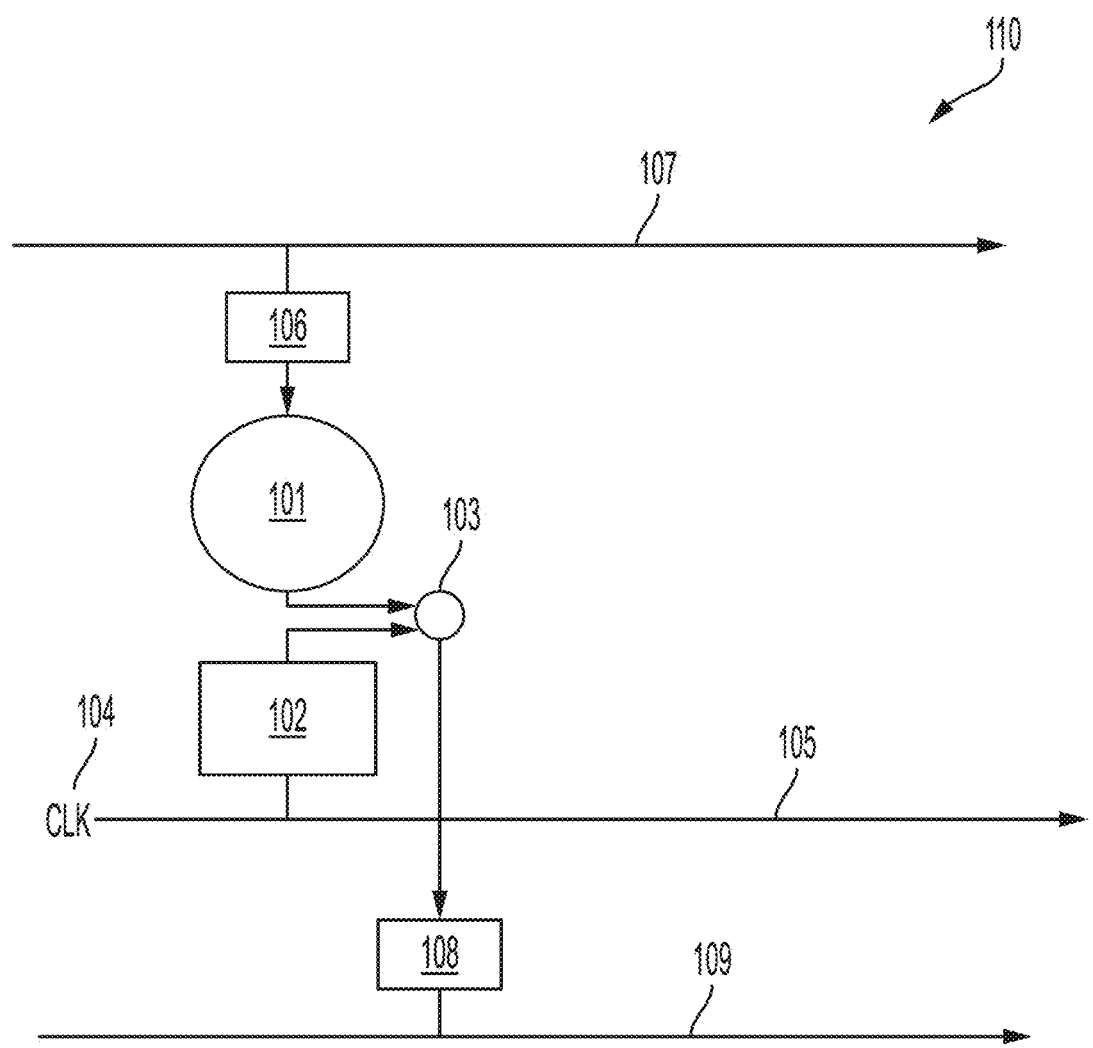
FIG. 1B is an example pixel that may be used in an example embodiment of a pixel array that may be used in some example embodiments of a readout method for compressed sensing.

FIG. 1B is an example pixel 110 that may be used in an example embodiment of a pixel array that may be used in some example embodiments of a readout method for compressed sensing. Pixel 110 may have the elements of pixel 100 of FIG. 1A, as described above, except data transfer from accumulator 103 may be connected to an output selector 108, which may include a memory used to readout values from accumulator 103. Data bus 109 may be connected to output selector 108 and may provide commands to read out values from accumulator 103.

Figure 2A:
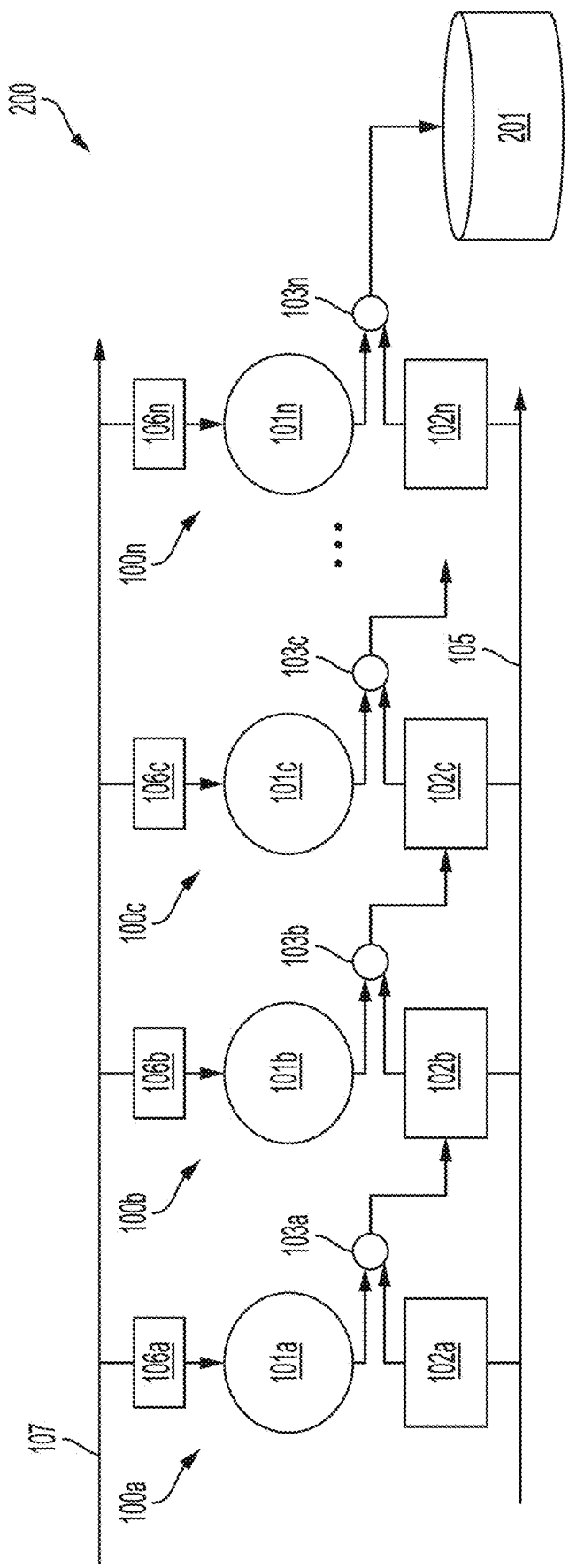
FIG. 2A is an example column or row of pixels that may be used by an example embodiment of a pixel array that may be used in some example embodiments of a readout method for compressed sensing.

FIG. 2A is an example pixel column (or row) 200 that may be used by an example embodiment of a pixel array that may be used in some example embodiments of a readout method for compressed sensing. Pixel column 200 depicts n example pixels 100a, 100b, and 100c connected together in series as well as an n-th final pixel, 100n (note that n may be any number greater than 1). For example, pixel 100a may be connected to pixel 100b, and pixel 100b may be connected to 100c, and so on. Each pixel may have photon sensors 101a to 101n. Accumulator 103a may be connected to memory 102b and accumulator 103b may be connected to memory 102c, and so on such as for accumulator 103c and onward. Data bus 105 may be connected to memories 102a, 102b, 102c, all the way to memory 102n, and may provide a clock signal 104 from FIG. 1A or FIG. 1B to pixels 100a-100n. Data bus 107 may be connected to mask memories 106a, 106b, 106c, all the way to mask memory 106n, and may provide mask data from FIG. 1A to pixels 100a-100n. Accumulator 103n may be connected to an offline storage 201 that may be used to collect and process compressed sensing data collected from pixel column 200.

In one embodiment, pixel column 200 may comprise a digital pixel architecture where photons may be counted and transferred as digital packets of information between pixels. In other embodiments, pixel column 200 may comprise analog pixel architecture where photons may be converted to a charge and the charge may be transferred between pixels.

In other embodiments, data from pixel 100a may not be sent to the memory of pixel 100b and instead may send it to pixel 100c. In yet other embodiments, data from pixel 100a may be sent to a pixel later in pixel column 200 (not shown). In yet other embodiments, there may be additional pixel rows 200 and pixels from a first row may be connected to pixels from a second row, as will be described further with respect to FIG. 3. In other embodiments, a pseudo-random mask may be applied to one or more pixel column 200 to force values of select photon sensors 101a-101n to return a zero or a non-zero value, which will be discussed in more detail with respect to FIG. 7. That is, the accumulators from one pixel need not feed into the memories of immediately adjacent pixels. There are many accumulator-memory feed patterns, as will be apparent to one after reading the present disclosure.

Figure 2B:
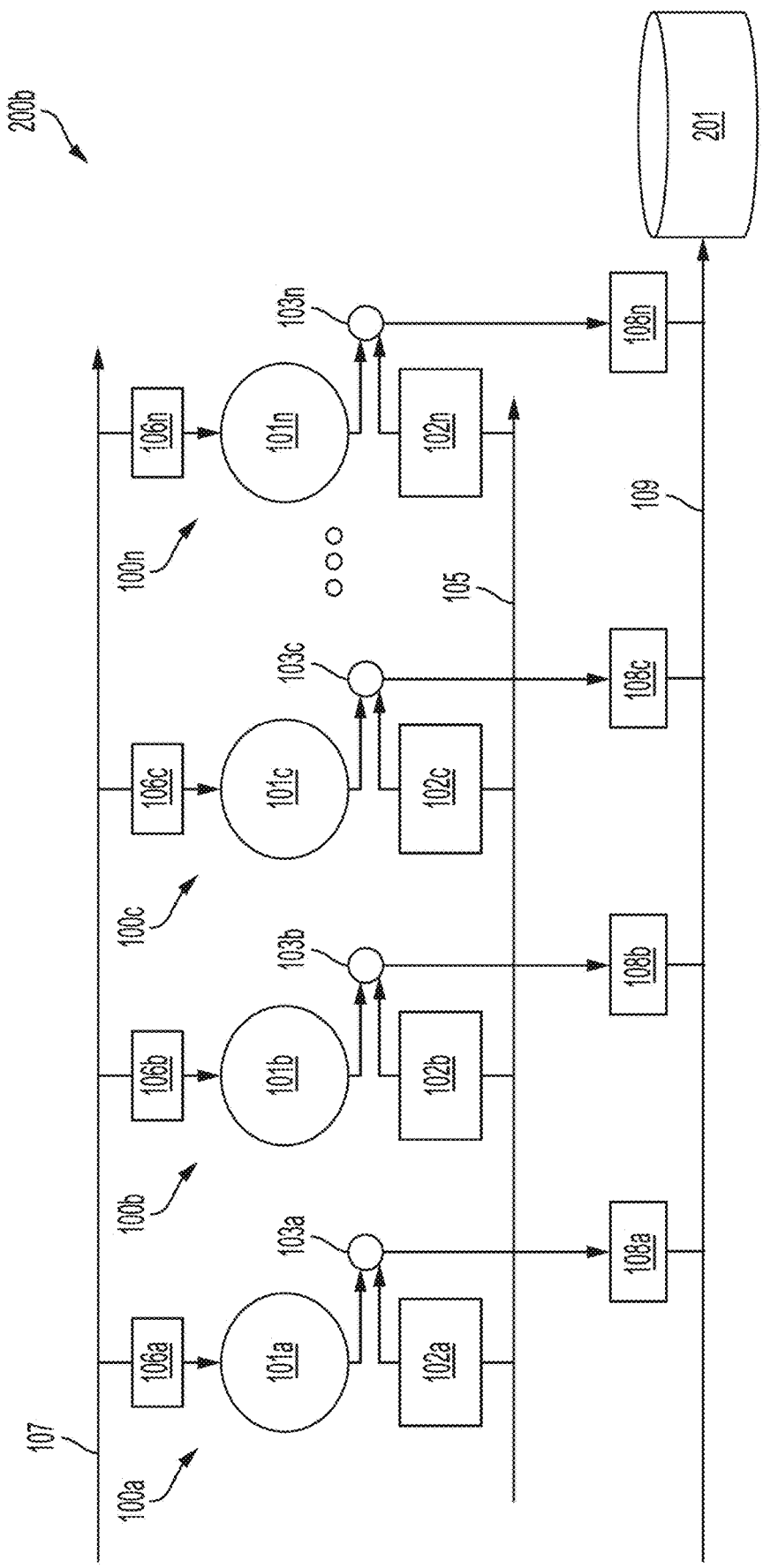
FIG. 2B is an example column or row of pixels that may be used by an example embodiment of a pixel array that may be used in some example embodiments of a readout method for compressed sensing.

FIG. 2B is an example pixel column (or row) 200b that may be used by an example embodiment of a pixel array that may be used in some example embodiments of a readout method for compressed sensing. Pixel column 200b may have the elements of pixel column 200 of FIG. 2A except that it may use pixel 110 of FIG. 1B instead of pixel 100 of FIG. 1A. In one embodiment, pixel column 200b may have data transfer out of pixels 100a to 100n through a set of output selectors 108a to 108n. For example, for pixel 100a, when a data read request for pixel 100a is sent via data bus 109, output selector 108a may select a value from accumulator 103a which may then send the value to output selector 108a and via data bus 109 to offline storage 201 or to another pixel 100a-n. This process may be repeated for any pixel 100a to 100n in pixel column 200b.

Figure 3:
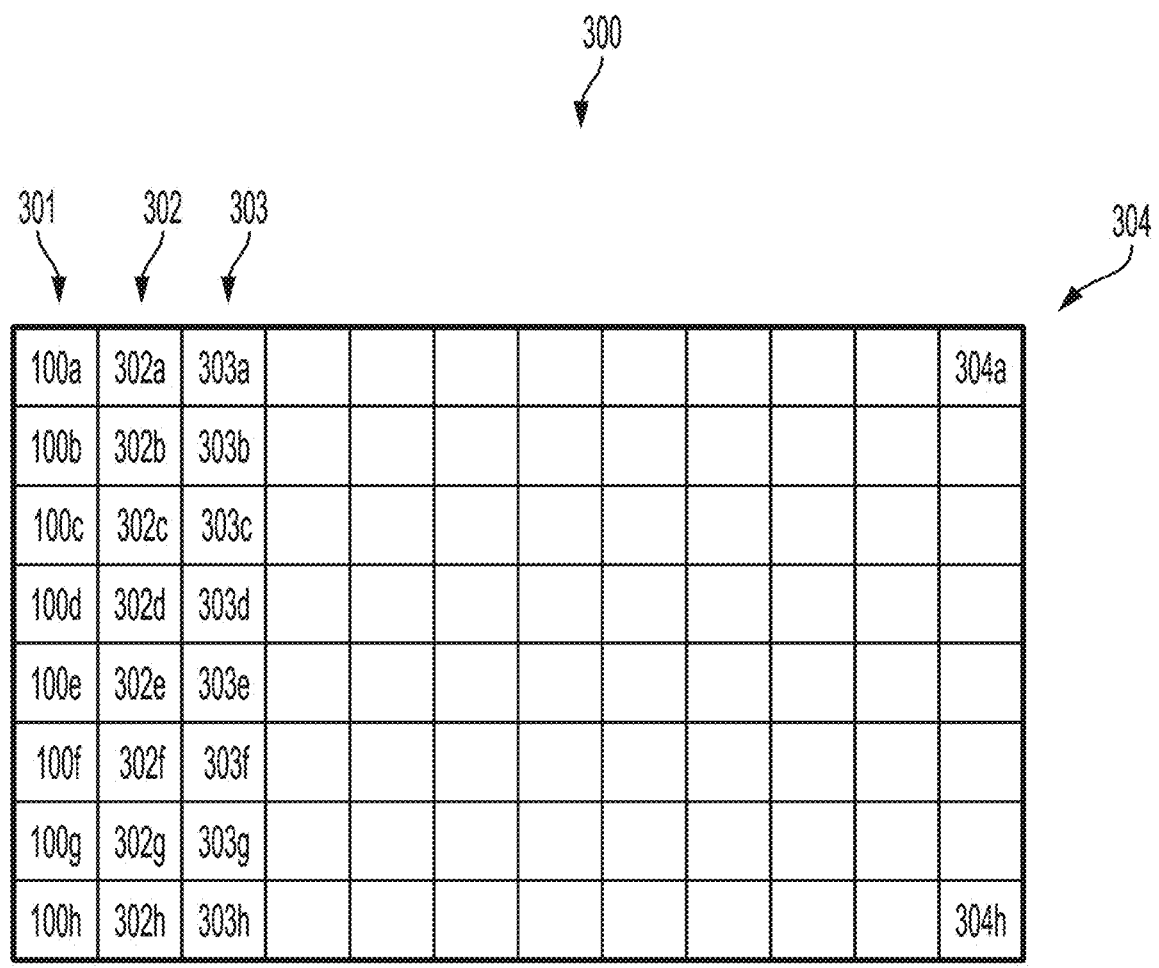
FIG. 3 is an example pixel array that may be used in some example embodiments of a readout method for compressed sensing.

FIG. 3 is an example pixel array 300 that may be used in some example embodiments of a readout method for compressed sensing. Pixel array 300 may have a first column (or row) 301 comprising a plurality of pixels. In the present example, eight pixels 100a to 100h are shown, which may be pixels 100a to 100n of column 200 of FIG. 2A or column 200b of FIG. 2B. There may be a second column 302 with pixels 302a to 302h, a third column 303 with pixels 303a to 303h, and so on to column 304 with pixels 304A-B to 304h, which may likewise be similar to column 200 of FIG. 2A or column 200b of FIG. 2B. In other embodiments, there may be different row and column dimensions of pixel array 300, from 1 by 1 to any other size. As mentioned previously with respect to FIG. 2A, pixels in first column 301 may be connected to each other (for example, the accumulator of one pixel may be connected to the memory of another pixel), for example, pixel 100a may be connected to pixel 100b, pixel 100b may be connected to pixel 100c, and so on. In other embodiments, pixel 100a from first column 301 may be connected to pixel 302b of second column 302, which may then be connected to pixel 303c of third column 303, and so on. In other embodiments, there may be other pixel connection configurations across columns, rows, or a combination of both columns and rows.

Figure 4A:
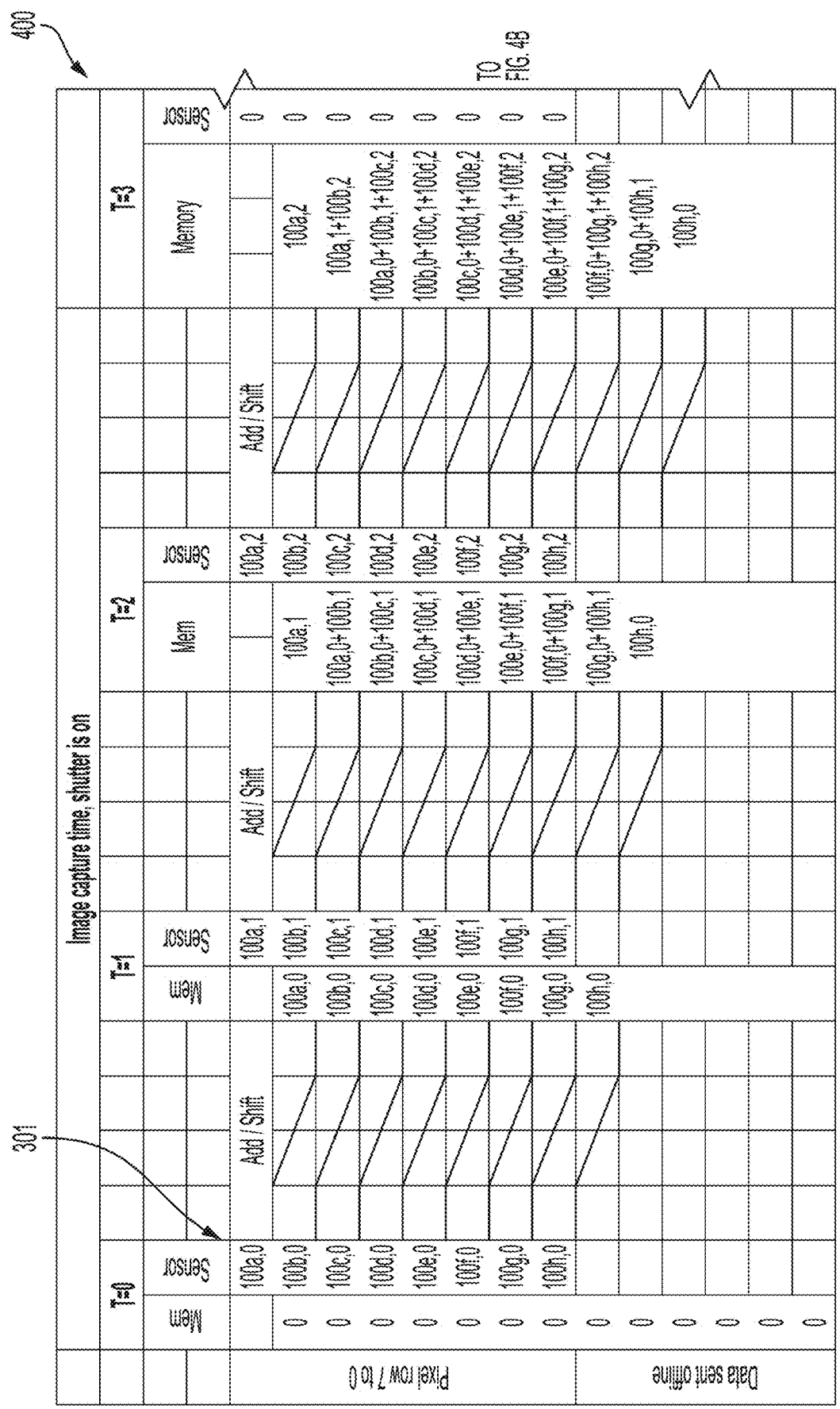
FIG. 4A-B is a data flow and timing diagram that may be used in an example embodiment of compressed sensing for a single column or row of pixels in a pixel array.
Figure 4B:
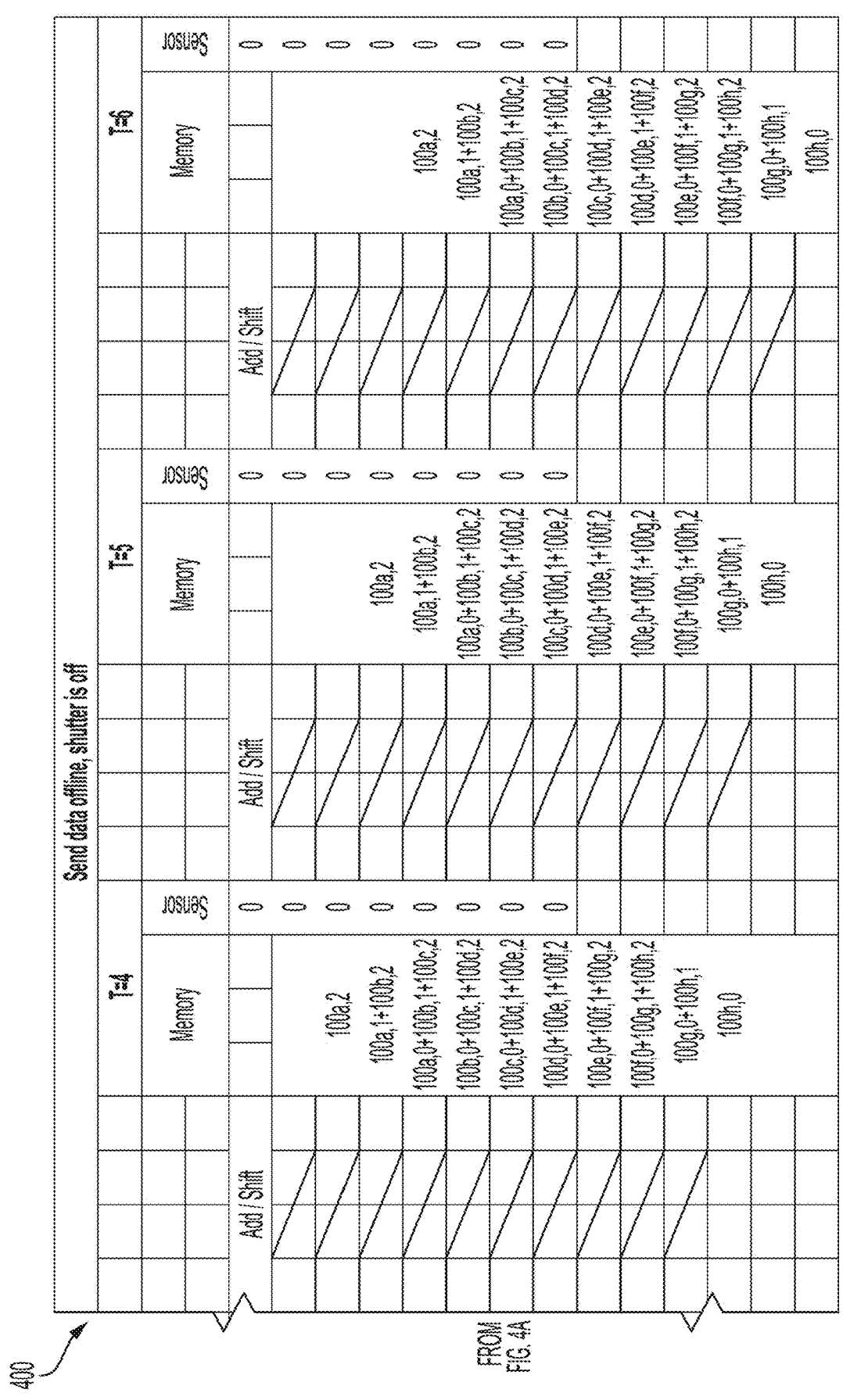

FIG. 4A-B is an example data flow and timing diagram 400 that may be used in an example embodiment of compressed sensing for a single column or row of pixels in pixel array 300 of FIG. 3. The data flow described below may be applied to all or some pixels of pixel array 300 of FIG. 3. In one embodiment, timing diagram 400 may be an example of a pixel column 200 of FIG. 2A with adding and linear shifting of data, without using a mask. In another embodiment, timing diagram 400 may be an example of another series of connected pixels.

FIG. 4A-B depicts a series of connected pixels 100a to 100h, with their respective memories 102a to 102h, of first column 301 of FIG. 3, and offline memory 201 of FIGS. 2A and 2B, over the course of an example 7 clock cycles, (t=0 to t=6). Pixels 100a to 100h may have accumulators 103a to 103h (not shown). There are three clock cycles where a shutter value is set to ON, or open, and four clock cycles with a shutter value set to OFF, or closed. A shutter may be a physical shuttering mechanism or it may be a logical shutter. A logical shutter may allow photon sensors 100a-100h to be activated or deactivated.

A shutter value may be a logical state when imaging is occurring or when it is not occurring. A shutter value of ON or open may represent a state where photon sensors 100a-100h are able to sense photons. A shutter value of OFF or closed may represent a state where photon sensors 100a-100h are not able to sense photons.

In this example, data may be transferred between adjacent pixels, for example, data from pixel 100a's accumulator 103a may be transferred to pixel 100b's memory 102b, and data from pixel 100b's accumulator 103b may be transferred to pixel 100c's memory 102c, and so on. For additional rows where there is no pixel, the data can be considered moved to/amongst and stored within one or more locations within offline storage 201 of FIG. 2A. The logic used to describe the data flow in column 301 may be applied to other columns of pixel array 300 of FIG. 3. In general terms, the value of a pixel 100a at time 0 will be denoted 100a,0, and at time 1 will be denoted 100a,1, and so on. The numbers in FIG. 4A-B will use this format.

In the first clock cycle (t=0), pixels 100a to 100h image a scene, not shown. Pixel 100a has 0 in corresponding memory 102a. Pixel 100a may receive a first photon information value, which may be a count of photons or an electrical charge, and may store it in accumulator 103a. The value stored in accumulator 103a is added to a second photon information value in memory 102a (which at t=0 may be 0), forming a third photon information value, and the third photon information value is shifted to memory 102b of pixel 100b. In one embodiment, the shifting is performed at the end of the same clock cycle. The photon sensor 101a associated with pixel 100a and the accumulator 103a may be then be set to zero before the next clock cycle, or at the beginning of the next clock cycle before imaging begins. In another embodiment, the shifting may be performed in the beginning of the next clock cycle. That is, pixels capture photon counts, store them in their associated accumulators, add the memory values to the accumulator values, and shift the new value to the next memory (which may be a neighboring pixel, a pixel located elsewhere on the pixel array, or a next memory location in offline storage 201). In one embodiment, the pixels capture charges, store them in associated accumulators that also serve as memory, accumulate the charges in memory and from the pixels together, and transfer the charge to an accumulator associated with a different pixel in the pixel array. The photon sensor of pixel 100a (not shown) may be reset to zero in preparation for sensing in the next clock cycle. After the shifting of data, and before any new photon sensing, the photon sensors and accumulators 103a-h are reset.

In the second clock cycle (t=1), pixel 100b receives a count of photons and may store it in accumulator 103b. The value stored in accumulator 103b is added to the value in memory 102b, and shifted to memory 103c of pixel 100c. The photon sensor 101b and accumulator 103b of pixel 100b (not shown) may be reset to zero in preparation of sensing in the next clock cycle.

Meanwhile, in the first clock cycle (t=0) pixel 100b has 0 in corresponding memory 102b. Pixel 100b may receive a count of photons and store it in accumulator 103b. The value stored in accumulator 103b is added to memory 102b and shifted to memory 102c. In one embodiment, the shifting is performed at the end of the same clock cycle. In another embodiment, the shifting may be performed in the beginning of the next clock cycle. The photon sensor of pixel 100b (not shown) may be reset to zero in preparation of sensing in the next clock cycle. In the second clock cycle (t=1), pixel 100c receives a count of photons and may store it in accumulator 103c. The value stored in accumulator 103c is added to the value in memory 102c and shifted to memory 103d. The accumulator 103b element of pixel 100c may be reset to zero in preparation of sensing in the next clock cycle.

The above operations may be repeated for each pixel of pixel array 300. Thus, for each clock cycle, each pixel 100a to 100h may add the value of its photon count to the value in its memory 102a to 102h, which may be the value provided to it from a previous pixel for all t>0. The value may then be sent to the memory of the next attached pixel.

At time t=3, the clock shutter status changes from ON to OFF, and pixels 100a to 100h no longer detect or count photons. The values in each cell memory will no longer be modified by the accumulator, and will be shifted over time to offline storage 201, which is the recipient of data shifts from the last pixel's memory (in this example, 102h).

Data stored in offline storage 201 may be used for compressed sensing signal reconstruction. Data may be shifted between memories to offline storage 201. In one embodiment, at time t=1, data from pixel 100h from time t=0 may be shifted to offline storage 201. Each data value may be shifted to another pixel memory location, to offline storage 201, or may remain in the same memory location for each clock cycle.

In other embodiments, data stored in memory 102a may be sent to memory 102c or to other memories in pixel column 301 of FIG. 3. In other embodiments, memory 102a may send data to memory in other columns of FIG. 3. In other embodiments, memory 102a may be sent back and forth between memory of another pixel and itself. In other embodiments, data can be transferred only for a region of interest, that is, a subset of pixels within pixel array 300 of FIG. 3. That is, as mentioned above, each pixel's accumulator need not be connected to the memory of an immediately adjacent pixel—other interconnect patterns are possible.

In other embodiments, a pseudo-random mask may be applied to pixel array 300 of FIG. 3. Referring back to FIG. 4A-B, for example, first column 301 may have a pseudo-random mask applied, which is discussed in more detail with respect to FIG. 5. Other pixel types, such as pixels in pixel array 200b may be used. In one embodiment, a pseudo-random mask may be the same for all clock cycles. In yet other embodiments, where memory values may not be shifted and may stay stored in the same memory units, a changing pseudo-random mask may be applied. This pseudo-random mask may change for each clock cycle. In one embodiment, masks may be in a series and that series may be repeated. For example, if there are four mask patterns A, B, C, and D, a mask series ABCD may be used and may be repeated over a number of clock cycles. Mask values may be binary, such as 0 or 1, such that the output value of photon sensors 101a-101h under the influence of the mask may be forced to 0 or may remain unchanged. The further operation of masks with regard to pixels is described further below with regard to FIG. 5.

The technique described above may be used for any type of image sensor. As will be described more with regard to FIGS. 7-10, the hardware configurations may vary depending on the type of image sensor.

In some embodiments, the compressed sensing measurement y=Ax+e may have the variable x change from an N by 1 matrix to an N+b by 1 matrix, where b represents the number of "data shifts" that have occurred during an imaging (i.e. shutter ON). For example, if there are three shifts for three time periods, x may be of size N+3 by 1 instead of N+1.

Figure 5:
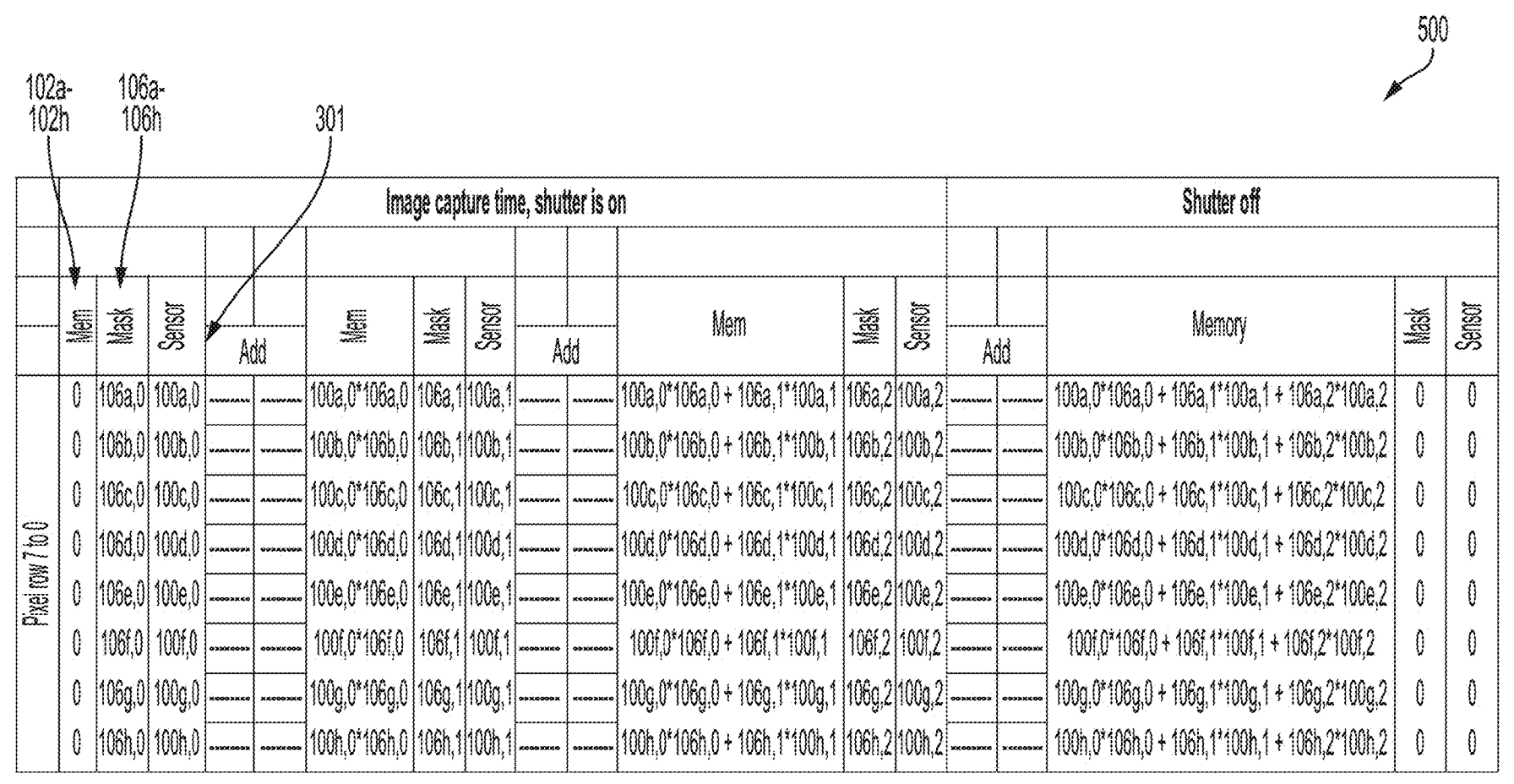

FIG. 5 is an example data flow and timing diagram 500 that may be used in an example embodiment of compressed sensing for a single column or row of pixels 301 in pixel array 300 of FIG. 3. FIG. 5 also describes the impact of a mask on the pixel array 300 and individual pixels 100. The data flow described below may be applied to all or some pixels of pixel array 300 of FIG. 3. The use of a mask as described below and the data flow may be applied to the logic of FIG. 4A-B. In one embodiment, timing diagram 500 may be an example used with a pixel column 200b of FIG. 2B with accumulators 103a-103h, output selectors 108a-108h, and mask memories 106a-106h. Pixel 100a may be connected to data selector 108a, pixel 100b may be connected to output selector 108b, and so on for pixel 100h being connected to output selector 108h. Mask memory 106a may be part of pixel 100a, mask memory 106b may be part of pixel 100b, and so on for mask memory 106h being connected to pixel 100h.

In alternative embodiments, pixel column 200a of FIG. 2A may be used or another series of pixels in a pixel array may be used. Mask memories 106a to 106h may be used with the pixels 100a to 100h and data flow operations in FIG. 4A-B or any other arrangement of pixel connections.

In general terms, the value of a pixel 100a and mask memory 106a at time 0 will be denoted 100a,0 and 106a,0, respectively, at time 1 will be denoted 100a,1 and 106a,1 respectively, and so on. The numbers in FIG. 5 may use this format.

FIG. 5 depicts a series of connected pixels 100a-h, with their photon sensors 101a-h, their respective memories 102a to 102h, and their respective mask memories 106a-h, of first column 301 of FIG. 3 with four clock cycles (t=0 to t=3). There are three clock cycles where a shutter value is set to ON and one clock cycle with a shutter value set to OFF. In this example, data may remain in each pixel after each cycle, for example, data from pixel 100a's accumulator may be accumulated in memory 102a, and data from pixel 100b's accumulator may be accumulated in memory 102b, and so on. That is, in the present embodiment, each pixel transfers the results of a cycle to its own memory, rather than to a second pixel in a series.

In the first clock cycle (t=0), pixels 100a to 100h image a scene, not shown. Pixel 100a has 0 in corresponding memory 102a. Pixel 100a's photon sensor 101a may receive a first photon information value, which may be a count of photons or an electrical charge, that may be multiplied by a binary value from mask memory 106a and the result may be stored in accumulator 103a. If mask memory 106a is equal to 1, the first photon information value accumulated may be stored. If mask memory 106a is equal to 0, the accumulator may store a 0 value. This multiplication may be logical, or it may be the result of a physical operation; for example, the mask may enable or disable the photon sensor 101a, resulting in a normal reading or a 0 reading. The value stored in accumulator 103a is added to memory 102a. In one embodiment, pixels capture photon counts, masks transmit binary values that are multiplied by the pixel photon counts, the result is stored in their associated accumulators, and the memory values are added to the accumulator values, and may be stored in the memory once more. The photon sensor 101a and accumulator 103a of pixel 100a may be reset to zero in preparation of sensing in the next clock cycle.

In the second clock cycle (t=1), pixel 100a's photon sensor 101a may receive a first photon information value, the count may be multiplied by the value stored in mask memory 106a, and the resulting value may be stored in accumulator 103a. The value stored in accumulator 103a is added to a second photon information value in memory 102a, and the result may be stored in the memory once more as a third photon information value. The photon sensor 101a and accumulator 103a of pixel 100a may be reset to zero in preparation of sensing in the next clock cycle.

Meanwhile, in the first clock cycle (t=0) pixel 100b has 0 in corresponding memory 102b. Pixel 100b's photon sensor 101b may receive a count of photons that may be multiplied by a binary value from mask memory 106b and the result may be stored in accumulator 103b. If mask memory 106b is equal to 1, the photon count may be stored. If mask memory 106b is equal to 0, the accumulator may store a 0 value. The value stored in accumulator 103b is added to memory 102b and stored in memory 102b. Photon sensor 101b and accumulator 103b may be reset to zero in preparation of sensing in the next clock cycle. In the second clock cycle (t=1), pixel 100b's photon sensor 101b may receive a count of photons, the count may be multiplied by the value stored in mask memory 106b, and the resulting value may be stored in accumulator 103b. The value stored in accumulator 103b is added to the value in memory 102b, and the result is stored in memory 102b. The photon sensor 101b and accumulator 103b may be reset to zero in preparation of sensing in the next clock cycle. In another embodiment, accumulator 103b and memory 102b may be a single unit that serves the purpose of both accumulation and memory storage and during reset the accumulated values may be saved in the memory 102b that is associated with accumulator 103b.

The above operations may be repeated for each pixel of pixel array 300. Thus, for each clock cycle, each pixel 100a to 100h may multiply the value of its photon count by its mask value and add the resulting value to its memory 102a to 102h, which may be accumulated for t>0 when the shutter is on. The value may then be sent to the memory of the next attached pixel.

At time t=3, the clock shutter status changes from ON to OFF, and pixels 100a to 100h no longer count photons. The values in each cell memory will no longer be modified by the accumulator, and will be read by output selector elements (not shown) such as element 108 of FIG. 1B. This data may be sent to offline storage 201. Data stored in offline storage 201 may be used for compressed sensing signal reconstruction. The accumulators/memories of the pixels may be reset.

In some embodiments, the mask values may change for each clock cycle.

In other embodiments, the mask values may remain constant. In various embodiments, the number of shutter open and shutter closed cycles may vary.

Figure 6:
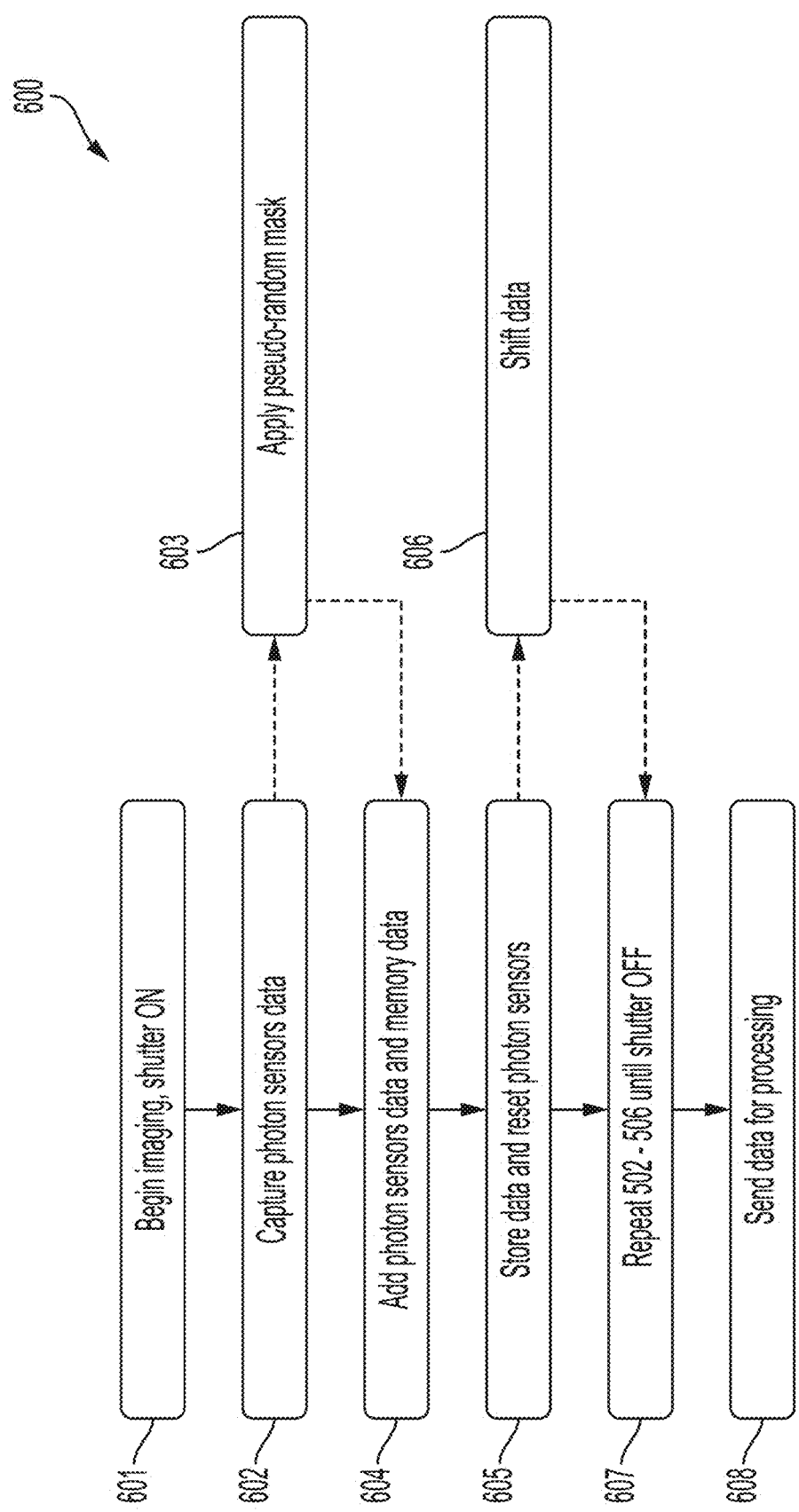
FIG. 6 is an example process flow that may be used in an example embodiment of the data flow and timing diagram of FIG. 4A-B or FIG. 5.

FIG. 6 is an example process 600 that may be used in an example embodiment of the data flow and timing diagram of FIG. 4A-B or FIG. 5.

Process 601 may begin imaging using pixel array 300 of FIG. 3. A shutter value may be a logical value that may switch from OFF to ON.

Process 602 may begin capturing data in pixels 100 of pixel array 300. In some embodiments, all pixels 100 of pixel array 300 may be used to capture data. In other embodiments, a subset of pixels may be used to capture data.

Process 603 is a process in an alternative embodiment to apply a pseudo-random mask to pixels 100 of pixel array 300. In some embodiments, the pseudo-random mask may be the same pattern throughout the entire imaging process. In other embodiments, the pseudo-random mask may vary by cycle. In some embodiments, process 603 may be skipped if a mask is not used. A mask may allow or block the photon sensor 101 from sensing, or it may allow or block the value of photon sensor 101 from being accumulated. A mask may have a value such as 0 or 1 multiplied by the value of photon sensor 101 or may block the charge from photon sensor 101 from being stored.

Process 604 may accumulate, or add together, values captured in photon sensor 101 and memory 102 of pixels 100 in pixel array 300.

Process 605 may store data accumulated in process 604. Process 605 may also include resetting photon sensors 101 back to zero.

Process 606 is an operation in an alternative embodiment that may shift data stored from process 605. In some embodiments, data may be shifted to memory 102 associated with a different pixel 100. In other embodiments, data may remain in the same memory 102 and may not ever be shifted. In yet other embodiments, data may transfer back and forth between a first memory (such as of a first pixel 100) and a second memory (such as of a second pixel 100).

Process 607 may repeat processes 602 to 606 until a shutter value of OFF is received.

Process 608 may transfer data from pixel array 300 to offline storage 201 for compressed sensing processing.

Figure 7:
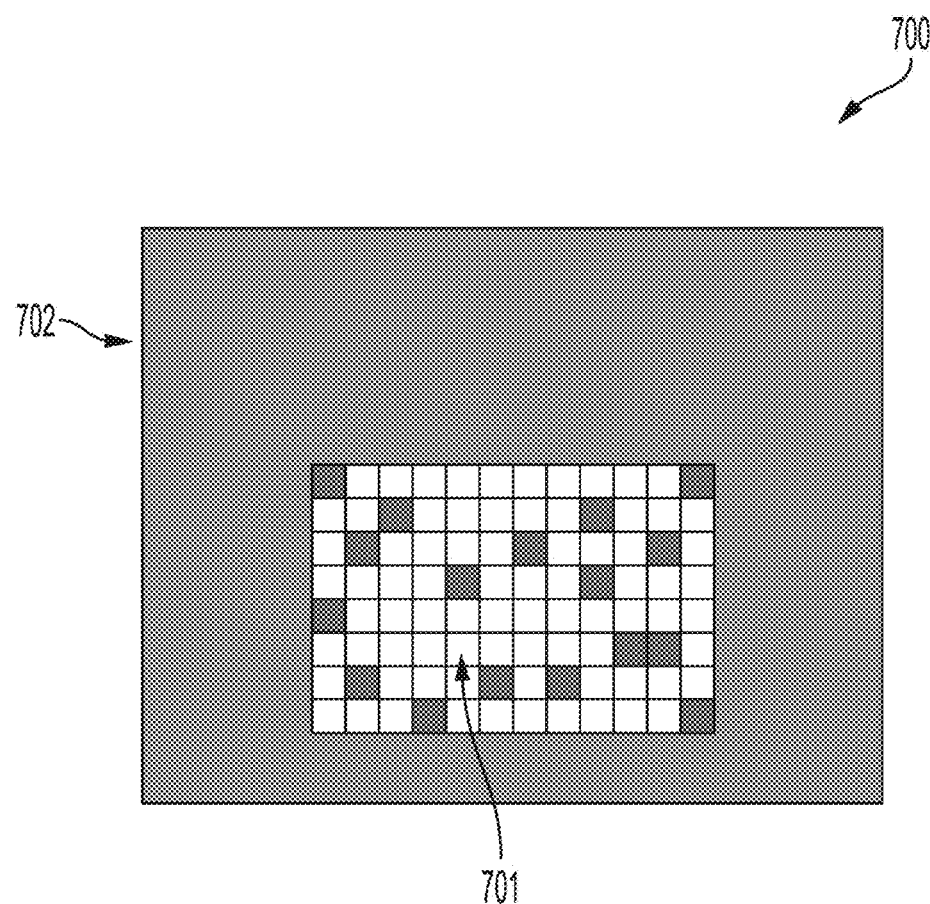
FIG. 7 is an example pseudo-random mask that may be used in an example embodiment of compressed sensing.

FIG. 7 is an example pseudo-random mask 700 that may be used in an example embodiment of compressed sensing. Pseudo-random mask 700 may comprise a region of interest 701 and a masking region 702. Pseudo-random mask 700 may block some pixels in pixel array 300 from imaging in region of interest 701. Further, a masking region 702 may block all pixels outside of a region of interest 701 from imaging and may be used to reduce the imaging area on pixel array 300. Pseudo-random mask 700 may be used during the processes of FIG. 4A-B/FIG. 5 as described previously. For each clock cycle, pseudo-random mask 700 may remain constant or may be dynamic and change. The values of pseudo-random mask 700 may be stored for later use during signal reconstruction.

As will be described further with regard to FIG. 11, a pseudo-random mask 700 may be used for lossless reconstruction by capturing differential images. A pseudo-random mask 700 may also be used when data is too dense and may add sparsity to an image to find a solution for image reconstruction. The type of pseudo-random mask 700 used may vary by the type of imaging task. A pseudo-random mask 700 may be a Bernoulli, Hadamard, Gaussian, discrete cosine transform (DCT), or other mask type. Pseudo-random mask 700 may include binary, greyscale, colored, or other values.

In some embodiments, mask 700 may be stored in offline storage 201 for use during image reconstruction. Mask 700 may be generated by a processor (not shown) and provided to pixels in pixel array 300 of FIG. 3 during imaging. Mask 700 may be supplied by offline storage 201 or may be generated by a processor (not shown) and sent to pixels via data bus 107. Mask 700 may be stored in mask memories 106a to 106n to be used by pixels 100a to 100n of FIGS. 2A and 2B. Mask 700 may be stored in offline storage 201 for use during signal reconstruction.

Figure 8:
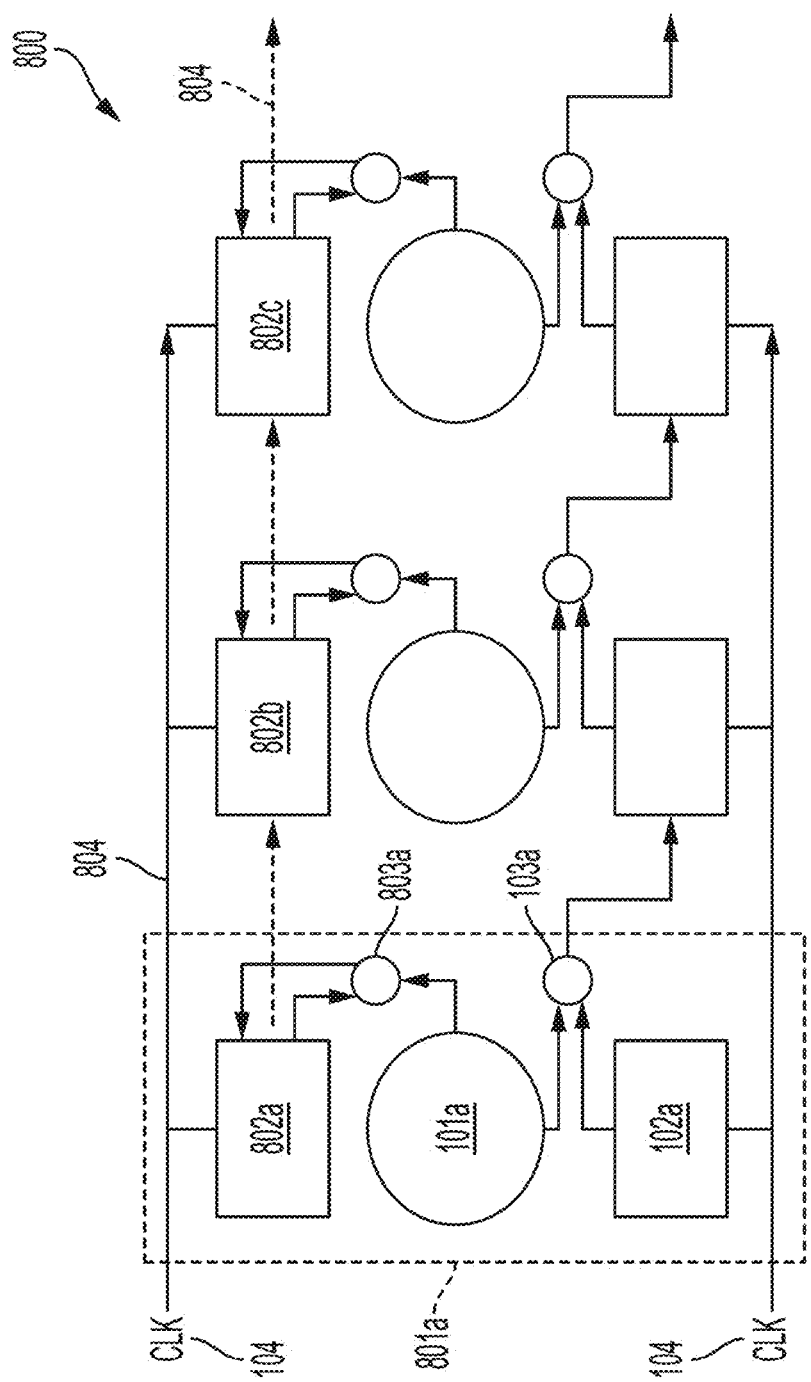
FIG. 8 is a schematic diagram of another example embodiment of a pixel architecture with a secondary memory used for integration.

FIG. 8 is a schematic diagram of another example embodiment of a pixel architecture 800 with a secondary memory used for integration. Integration may be the accumulation of photon information within a single memory. FIG. 8 shows an example pixel column 200 of FIG. 2A or column 200b of FIG. 2B. Pixel 801a may be a pixel in pixel column 200. Photon sensor 101a may be a photodiode. There may be a second memory 802a, a second accumulator 803a, and a second data path 704 that may also be connected to clock signal 104. During imaging, second memory 802a may accumulate values provided by second accumulator 803a which may collect data from photon sensor 101a. For each clock cycle when imaging occurs, second memory 802a may store values and may not shift values to other memories. When imaging is finished, second data path 704 may be used to transfer data from memory 802a to a memory 802b, 802c, and/or to offline storage 201 (not shown). In alternative embodiments, second data path 704 may be connected to output selector 108 (not shown), such as in FIG. 1B and data may be transferred to offline storage 201 by selection instead of shifting data through other pixels to offline storage 201.

Figure 9:
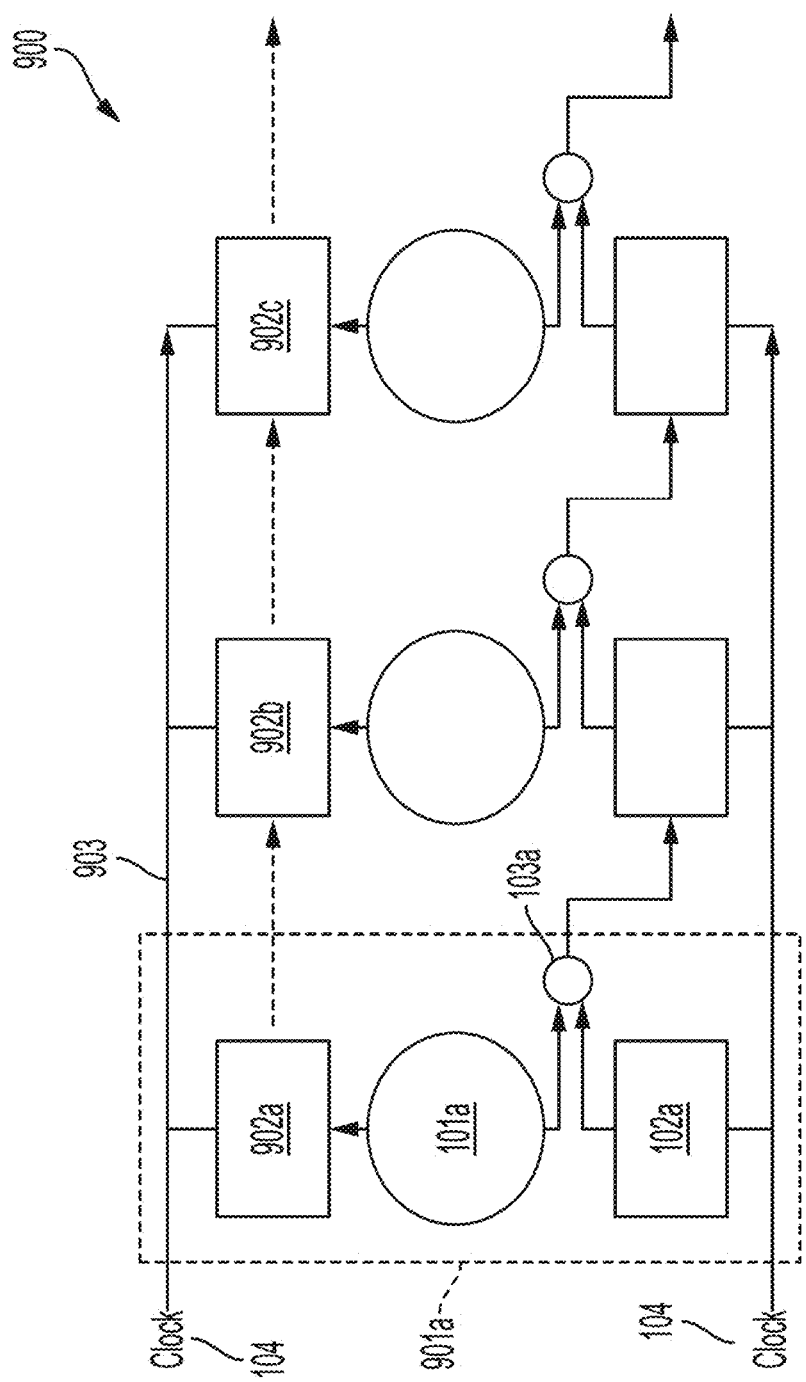
FIG. 9 is a schematic diagram of another example embodiment of a digital pixel architecture with a SPAD sensor.

FIG. 9 is a schematic diagram of another example embodiment of a digital pixel architecture 900 with a SPAD sensor. FIG. 9 shows an example pixel column 200 of FIG. 2A or column 200b of FIG. 2B. Pixel 901a may be a pixel in pixel column 200. Photon sensor 101a may be a single photon avalanche diode or other digital sensor. There may be a counter 902a to 902c and a second data path 803 that may also be connected to clock signal 104. Counter 902 may count photons detected by photon sensor 101a, accumulate and store this data for each clock cycle, and transfer data. During imaging, counter 902a may accumulate, or integrate, values provided by photon sensor 101a. For each clock cycle when imaging occurs, counter 902a may store values and may not shift values to other counters. When imaging is finished, second data path 803 may be used to transfer data from a memory from counter 902a to a counter 902b, 902c, and/or to offline storage 201 (not shown). In another embodiment, counter 902a may employ an algorithm to enable high-dynamic-range imaging. If photon sensor 101a is saturated, or has a photon signal stronger than the sensor is capable of sensing, counter 902a may employ an algorithm to avoid saturation.

Figure 10:
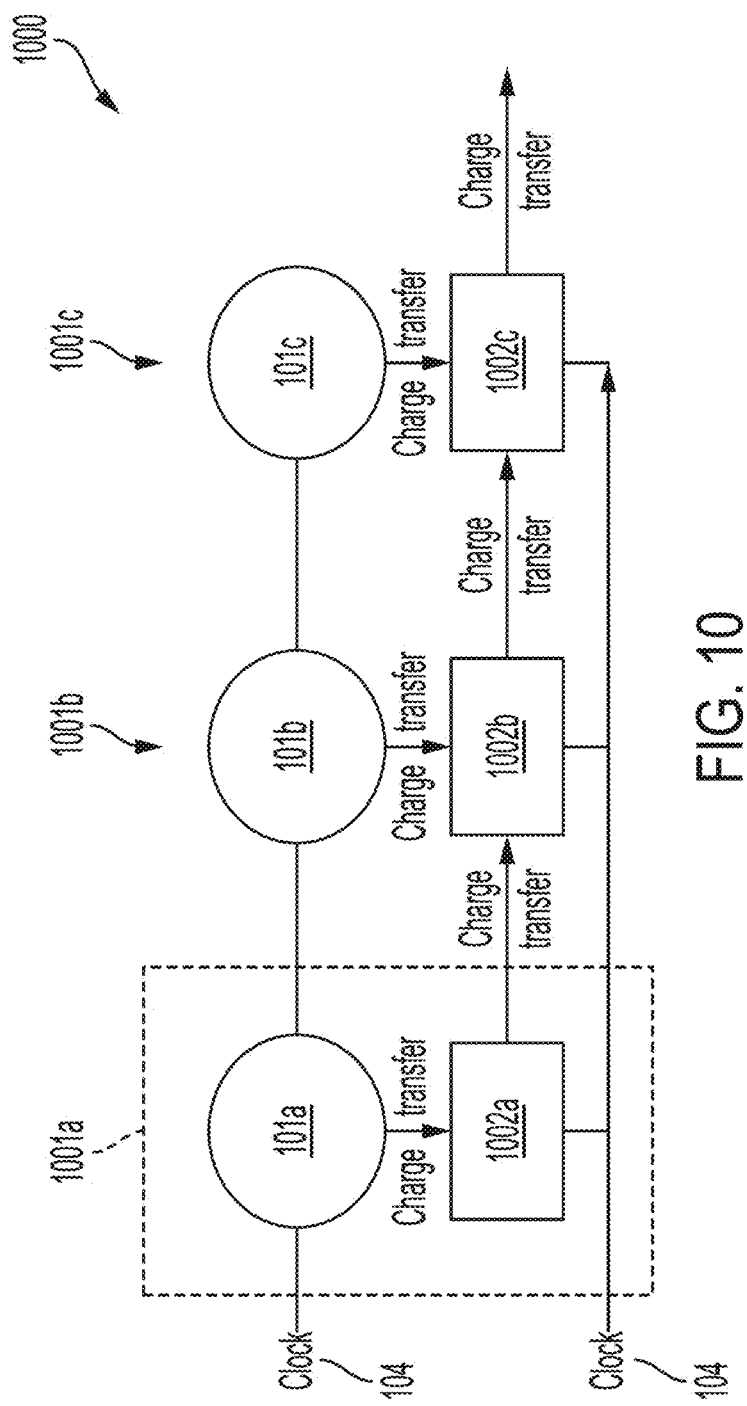
FIG. 10 is a schematic diagram of another example embodiment of a time-resolving pixel architecture with a CCD, CIS, or QIS sensor.

FIG. 10 is a schematic diagram of an example embodiment of a time-resolving pixel architecture 1000. FIG. 10 shows an example pixel column 200 of FIG. 2A or column 200b of FIG. 2B. Pixels 1001a to 1001c may be pixels in pixel column 200. Photon sensor 101a may be combined with memory accumulator unit 1002a to represent an analog output sensor, such as a CCD, CIS, or QIS pixels that may transfer a charge to neighboring pixels. Similarly, photon sensor 101b may be combined with memory accumulator 1002b and photon sensor 101c may be combined with memory accumulator 1002c. Photon sensor 101a may transfer charge to combined memory accumulator unit 1002a. The time resolution of photon sensor 101a may be based on the clock period of clock signal 104. For example, if a clock period is shorter, there may be fewer photons that can be detected (higher resolution). If a clock period is longer, there may be more photons that can be detected (lower resolution). During a sensing event, for a single pixel 1001a, a detected charge may be transferred from photon sensor 101a to unit 1002a, that may be a combined memory and accumulator unit. Unit 1002a may have a memory module that includes a mode to store memory and an accumulator module that includes a mode to accumulate charge. After a clock cycle, charge may be transferred from unit 1002a to a unit 1002b associated with pixel 1001b. After sensing completes, charge stored in unit 1002a may transfer to unit 1002b, which may then transfer to a unit 1002c, which may send charge or a digitized representation of charge to offline storage 201 (not shown). In another embodiment, charge stored in unit 1002a may be connected to output selector 108 (not shown), such as in FIG. 1B and data may be transferred to offline storage 201 by selection instead of shifting data through pixels.

Figure 11:
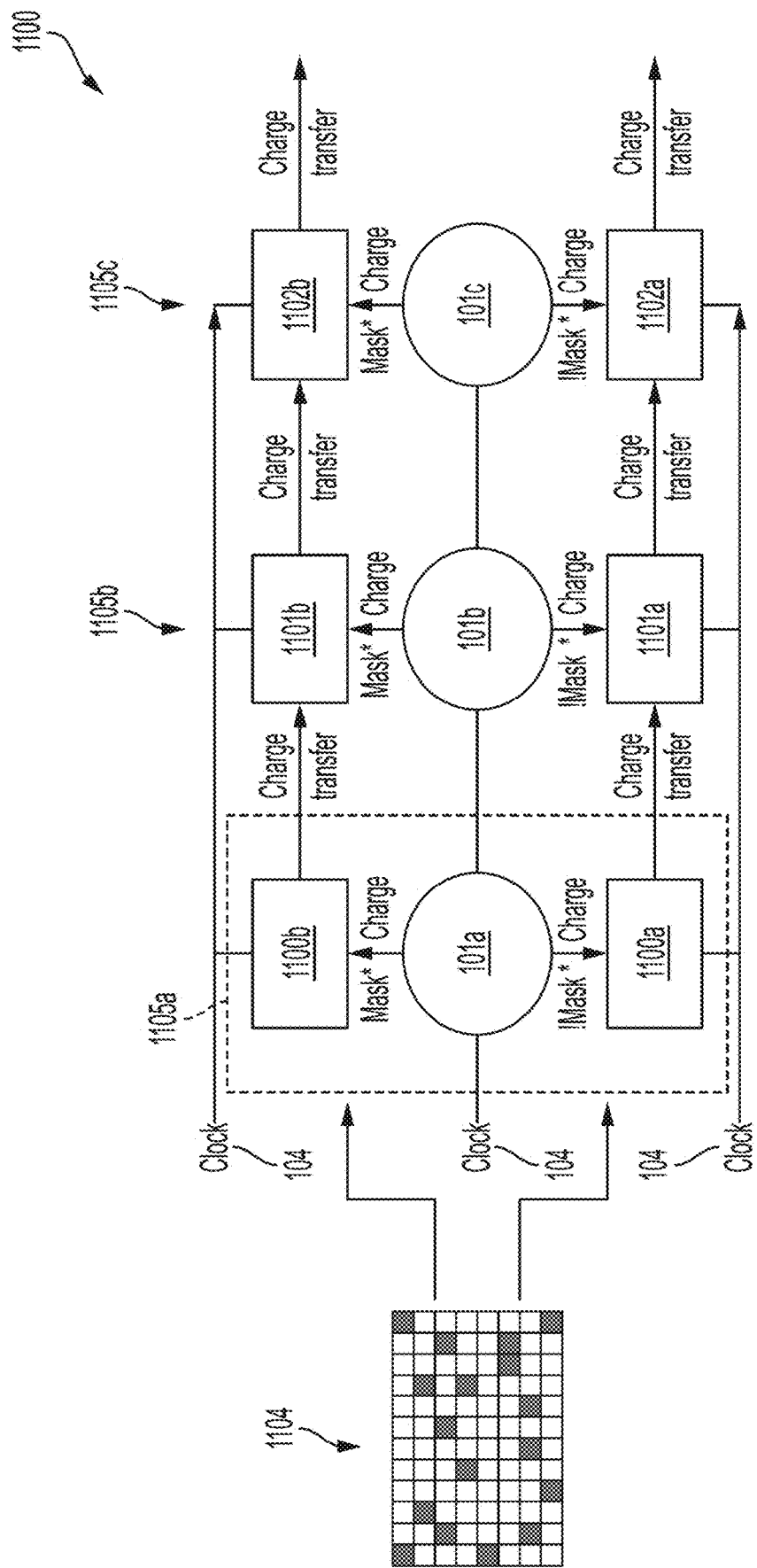
FIG. 11 is another example embodiment of a differential pixel architecture with a pseudo-random mask applied.

FIG. 11 is an example embodiment of a differential pixel architecture 1100 with a pseudo-random mask 1104 applied. FIG. 11 shows an example pixel column 200 of FIG. 2A or column 200b of FIG. 2B. Pixels 1105a to 1105c may be pixels in pixel column 200. Photon sensors 101a to 101c may be an analog output sensors, such as a CCD, CIS, or QIS sensors. In some embodiments, photon sensor 101a to 101c may be digital output sensors. Photon sensor 101a may transfer charge (in the analog cases) or digital values (in the digital cases) to combined memory accumulator units 1100a and 1100b. The resolution of photon sensor 101a may be the clock period of clock signal 104. During a sensing event, mask 1104 may be applied to pixels 1105a to 1105c. For a single pixel 1105a, a detected charge/value may be transferred from photon sensor 101a to units 1100a and 1100b, which may be a combined memory and accumulator unit. Units 1100a and 1100b may have a memory module and mode to store memory and an accumulator module and mode to accumulate charge. Unit 1100b may receive a charge/value multiplied together with a mask value from a pixel on mask 1104. Unit 1100a may receive a charge/value multiplied together by the inverse or reverse mask value from a pixel on mask 1104.

For example, if the value of a pixel of mask 1104 is 0, the inverse or reverse value of the pixel may be 1. By providing values of mask 1104 and reverse values of mask 1104 to pixels in pixel architecture 1100, a lossless signal reconstruction may be achieved.

After a clock cycle, charges/values may be transferred from unit 1100a to a unit 1101a and from unit 1100b to a unit 1101b associated with pixel 1105b. After sensing completes, charges/values stored in unit 1100a may transfer to a unit 1101a, and may then transfer to a unit 1102a, which may send the charges/values to offline storage 201 (not shown). A similar charges/value transfer may occur for units 1100b to 1102b. This may be used for a lossless image reconstruction. In another embodiment, charge stored in unit 1100a may be connected to output selector 108 (not shown), such as in FIG. 1B and data may be transferred to offline storage 201 by selection instead of shifting data through pixels.

Embodiments of the subject matter and the operations described in this specification may be implemented in digital electronic circuitry, or in computer software, firmware, or hardware, including the structures disclosed in this specification and their structural equivalents, or in combinations of one or more of the foregoing. Embodiments of the subject matter described in this specification may be implemented as one or more computer programs, i.e., one or more modules of computer-program instructions, encoded on a computer-storage medium for execution by, or to control the operation of, a data-processing apparatus. Alternatively or in addition, the program instructions can be encoded on an artificially generated propagated signal, e.g., a machine-generated electrical, optical, or electromagnetic signal that is generated to encode information for transmission to a suitable receiver apparatus for execution by a data processing apparatus. A computer-storage medium can be, or be included in, a computer-readable storage device, a computer-readable storage substrate, a random- or serial-access memory array or device, or a combination thereof. Moreover, while a computer-storage medium is not a propagated signal, a computer-storage medium may be a source or destination of computer-program instructions encoded in an artificially generated propagated signal. The computer-storage medium can also be, or be included in, one or more separate physical components or media (e.g., multiple CDs, disks, or other storage devices). Additionally, the operations described in this specification may be implemented as operations performed by a data-processing apparatus on data stored on one or more computer-readable storage devices or received from other sources.

While this specification may contain many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described herein. Other embodiments are within the scope of the following claims. In some cases, the actions set forth in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

As will be recognized by those skilled in the art, the innovative concepts described herein may be modified and varied over a wide range of applications. Accordingly, the scope of claimed subject matter should not be limited to any of the specific example teachings discussed above, but is instead defined by the following claims.

Embodiments of the inventive concept may extend to the following statements, without limitation:

Statement 1: A method for processing imaging data from a set of pixels, comprising:
  receiving a clock signal at a set of pixels, whereupon a first pixel of the set of pixels performs the actions of:
    Collecting a first photon information value from a photon sensor and storing the first photon information value in an accumulator;
    Adding a second photon information value from a memory associated with the first pixel into the accumulator to obtain a third photon information value;
    Storing the third photon information; and
    Resetting the photon sensor and the accumulator to zero.

The method of statement 1, wherein the third photon information is stored in a memory associated with a second pixel.

The method of statement 1, wherein the first, second, and third photon information values are one of a photon count or an electrical charge.

The method of statement 1, wherein the first pixel of the set of pixels repeats the actions upon the receipt of a plurality of subsequent clock signals.

The method of statement 4, wherein a shutter is open for at least one of the clock cycles.

The method of statement 5, wherein the shutter is closed for at least one of the clock cycles.

The method of statement 1, wherein the third photon information is stored by shifting to an offline storage for compressed sensing signal reconstruction.

The method of statement 1, wherein a pseudo-random mask is applied to the set of pixels.

The method of statement 8, wherein the pseudo-random mask remains constant during the collection time period.

The method of statement 8, wherein the pseudo-random mask is dynamic during the collection time period.

The method of statement 1, wherein the set of pixels is selected as a region of interest that is a subset of a larger pixel array.

The method of statement 1, wherein the first pixel further stores the photon information from the photon sensor in a second memory for integration of photon information in the second memory.

The method of statement 1, wherein the set of pixels are digital or analog.

The method of statement 1, wherein the third photon information is stored in the memory associated with the first pixel.

A pixel array architecture for compressed sensing, comprising:
  A pixel array with rows and columns;
  A data bus connected to the pixel array;
  Wherein each of at least two pixels of the pixel array further comprises:
    a photon sensor;
    a memory;

an accumulator; and
an output path connecting the accumulator to the memory.

The pixel array of statement 15, wherein the output path of a first pixel is connected to the memory of a second pixel in the pixel array.

The pixel array of statement 15, wherein the photon sensor comprises one of: a photodiode, a single photon an avalanche diode, a quanta image sensor, a charge coupled device, or a contact image sensor.

The pixel array of statement 15, wherein the photon sensor further comprises a mask memory to store mask data and a mask output path connecting the mask memory to the photon sensor.

The pixel array of statement 15, wherein the pixel array further comprises a data selector to select data from the accumulator and a selector output path connecting the data selector to an offline storage.

The pixel array of statement 15, wherein the photon sensor is a digital sensor and each pixel further comprises:
a second memory; and
a second accumulator to accumulate data collected data from the photon
sensor and the second memory and to store the accumulated data in the second memory.

The pixel array of statement 15, wherein the photon sensor is a single photon avalanche diode (SPAD) and each pixel further comprises a counter to accumulate outputs from the SPAD.

The pixel array of statement 15, wherein the photon sensor is an analog sensor and is capable of transferring charge to the memory and to the accumulator, and the accumulator is able to transfer charge to the memory or accumulator associated with a different pixel in the pixel array.

The pixel array of statement 15, wherein each of the pixels comprise a second memory and a second accumulator and the second memory is capable of storing a reverse value that is stored in the memory.

The pixel array of statement 15, wherein the memory and the accumulator comprise a single device serving both functions of storing and accumulating data or charge.

A method for processing imaging data from a set of pixels, comprising: receiving a clock signal at a set of pixels, whereupon a first pixel of the set of pixels performs the actions of:
Receiving a binary mask value;
Collecting a first photon information value from a photon sensor;
Multiplying the binary mask value and the first photon count and storing the result in an accumulator;
Adding a second photon information value from a memory associated with the first pixel into the accumulator to obtain a third photon information value;
Storing the third photon information value to a memory associated with the first pixel; and
Resetting the photon sensor to zero.

The method of statement 25, wherein the binary mask value is pseudo-randomly generated.

The method of statement 25, wherein the first pixel of the set of pixels repeats the actions upon the receipt of a plurality of subsequent clock signals.

The method of statement 25, wherein a shutter is open for at least one of the clock cycles.

The method of statement 28, wherein the shutter is closed for at least one of the clock cycles.

The method of statement 25, wherein the third photon information is selected with an output selector and sent to an offline storage for compressed sensing signal reconstruction.

The method of statement 25, wherein the binary mask value is applied to the set of pixels.

The method of statement 26, wherein the binary mask value that is pseudo-randomly generated remains constant for each clock signal during a collection time period.

The method of statement 26, wherein the binary mask value that is pseudo-randomly generated is dynamic during a collection time period.

The method of statement 25, wherein the set of pixels is selected as a region of interest that is a subset of a larger pixel array.

The method of statement 25, wherein the set of pixels are digital or analog.

The invention claimed is:

1. A method for processing imaging data from a set of pixels, the method comprising:
storing a first photon information value, from a photon sensor of a first pixel of the set of pixels, in an accumulator;
adding a second photon information value from a memory associated with the first pixel into the accumulator to obtain a third photon information value, the memory being connected between the accumulator and a clock signal; and
resetting the photon sensor to zero.

2. The method of claim 1, further comprising:
receiving the clock signal at the set of pixels;
collecting the first photon information value from the photon sensor; and
storing the third photon information value.

3. The method of claim 2, wherein based on receiving the clock signal, the first pixel performs the storing the first photon information value, the adding, the resetting, the collecting, and the storing the third photon information value.

4. The method of claim 2, wherein the first pixel stores the third photon information value in a first memory associated with the first pixel.

5. The method of claim 2, wherein the first pixel stores the third photon information value in a second memory associated with a second pixel.

6. The method of claim 1, further comprising causing the photon sensor to stop sensing, by way of a mask memory connected between a data bus and the photon sensor.

7. The method of claim 1, wherein the first pixel resets the photon sensor to zero based on storing the third photon information value in the memory.

8. An image-capturing device comprising:
a processor; and
a pixel array, comprising a first pixel,
wherein the processor is configured to cause the first pixel to perform:
storing a first photon information value, from a photon sensor of the first pixel in an accumulator;
adding a second photon information value from a memory associated with the first pixel into the accumulator to obtain a third photon information value, the memory being connected between the accumulator and a clock signal; and
resetting the photon sensor to zero.

9. The image-capturing device of claim 8, wherein the processor is configured to cause the first pixel to perform:
receiving the clock signal;

collecting the first photon information value from the photon sensor; and storing the third photon information value.

10. The image-capturing device of claim 9, wherein the first pixel stores the third photon information value in a first memory associated with the first pixel.

11. The image-capturing device of claim 9, wherein the first pixel stores the third photon information value in a second memory associated with a second pixel.

12. The image-capturing device of claim 8, wherein the processor is configured to cause the photon sensor to stop sensing, by way of a mask memory connected between a data bus and the photon sensor.

13. The image-capturing device of claim 8, wherein the processor is configured to cause the first pixel to reset the photon sensor to zero based on the first pixel storing the third photon information value in the memory.

14. An image-capturing device comprising:
a data bus; and
a first pixel comprising:
a mask memory;
an accumulator;
a memory connected between the accumulator and a clock signal; and
a photon sensor connected to the data bus via the mask memory, the mask memory being configured to cause the photon sensor to stop sensing.

15. The image-capturing device of claim 14, wherein the first pixel is configured to perform:
storing a first photon information value, from the photon sensor, in the accumulator;
adding a second photon information value from a memory associated with the first pixel into the accumulator to obtain a third photon information value; and
resetting the photon sensor to an initial value.

16. The image-capturing device of claim 15, wherein the initial value is zero.

17. The image-capturing device of claim 15, wherein the first pixel is configured to reset the photon sensor to the initial value based on the first pixel storing the third photon information value in the memory.

18. The image-capturing device of claim 15, wherein the first pixel is configured to perform:
receiving the clock signal;
collecting the first photon information value from the photon sensor; and
storing the third photon information value.

19. The image-capturing device of claim 15, wherein the first pixel is configured to store the third photon information value in a first memory associated with the first pixel.

20. The image-capturing device of claim 15, wherein the first pixel is configured to store the third photon information value in a second memory associated with a second pixel.

* * * * *